UNITED STATES PATENT OFFICE.

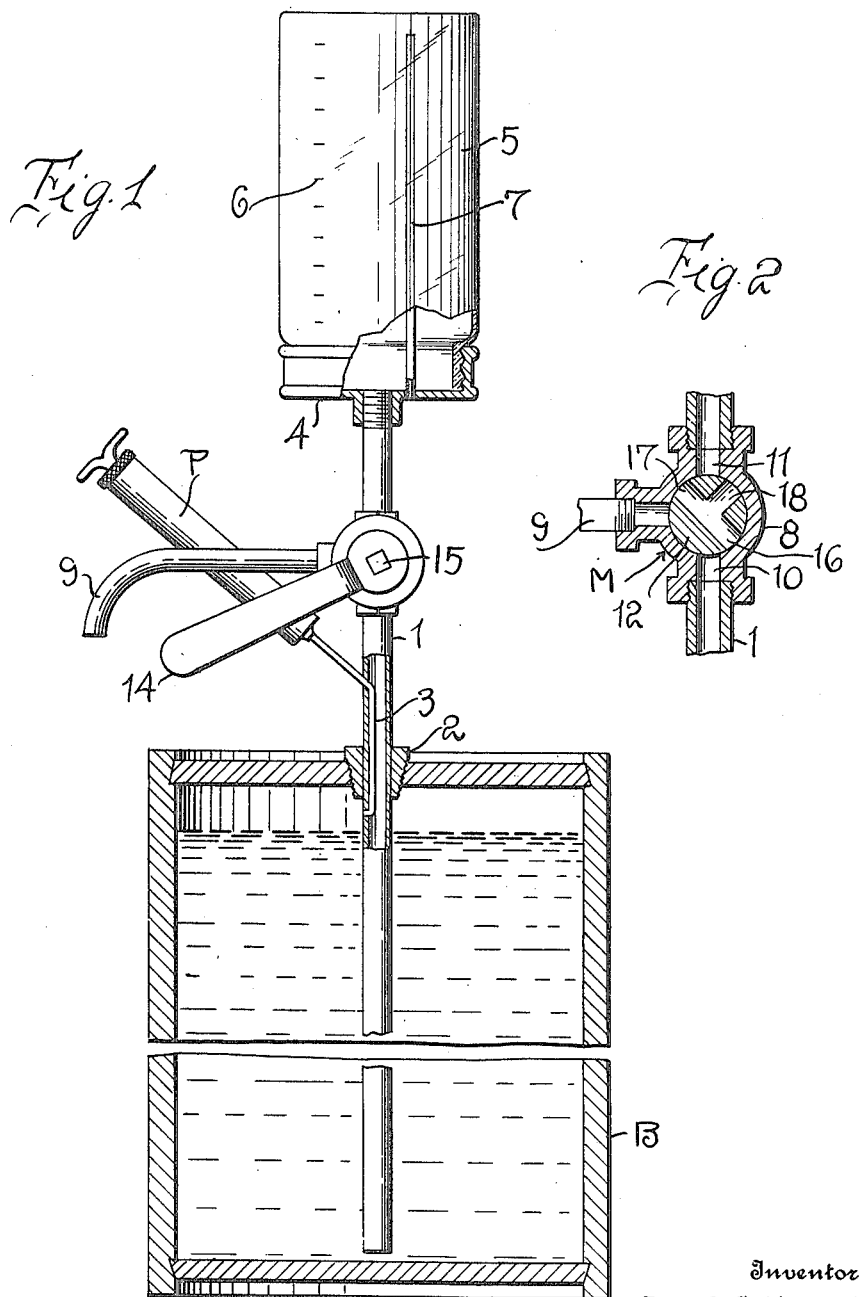

FLOYD C. KINGEN AND OLIVER H. McKEE, OF VANCOUVER, WASHINGTON.

DISPENSING MEANS FOR LIQUIDS.

1,197,941. Specification of Letters Patent. Patented Sept. 12, 1916.

Application filed November 18, 1915. Serial No. 62,191.

*To all whom it may concern:*

Be it known that we, FLOYD C. KINGEN and OLIVER H. McKEE, citizens of the United States, residing at Vancouver, in the county of Clarke and State of Washington, have invented certain new and useful Improvements in Dispensing Means for Liquids, of which the following is a specification, reference being had to the accompanying drawings.

This invention relates to certain improvements in dispensing means for liquids; and it is an object of the invention to provide a novel and improved apparatus of this general character including a supplemental reservoir into which the liquid to be dispensed is delivered before said liquid is discharged.

Furthermore, it is an object of the invention to provide an apparatus of this general character wherein the supplemental reservoir or container is provided with liquid measure indications whereby the quantity of liquid to be discharged may be determined with convenience and facility.

The invention consists in the details of construction and in the combination and arrangement of the several parts of our improved dispensing means for liquids whereby certain important advantages are attained and the device is rendered simpler, less expensive and otherwise more convenient and advantageous for use, all as will be hereinafter more fully set forth.

The novel features of the invention will be carefully defined in the appended claim.

In order that our invention may be the better understood, we will now proceed to describe the same with reference to the accompanying drawings, wherein—

Figure 1 is a view, partly in elevation and partly in section, of a dispensing apparatus constructed in accordance with an embodiment of our invention; and Fig. 2 is a vertical sectional view taken through the controlling member, the coacting discharge spout being indicated in fragment and in elevation.

As disclosed in the accompanying drawings, B denotes a container, such as a barrel, in which the liquid to be dispensed is initially contained.

Our improved dispensing apparatus comprises a conduit or pipe 1 adapted to be disposed through the upper end of the container or barrel and of such a length as to terminate within the container at a point in close proximity to the lower head thereof and carried by the conduit or pipe 1 and coacting with the upper head of the container or barrel B is the tapered nut 2 serving to make a hermetic connection between the upper head of the container and the pipe or conduit 1.

Disposed within the conduit or pipe 1 and arranged longitudinally thereof is a tube 3 of a length to bridge the upper head of the barrel or container and having its lower extremity in communication with the interior of the container or barrel B at a point in close proximity to the nut 2. The opposite extremity extends exteriorly of the conduit or pipe 1 and is in communication with the atmosphere, the extended portion of the tube being disposed on an upward incline. The outer extremity of the tubing 3 is adapted to be connected with a suitable source of air under pressure and, as herein disclosed, said source is a conventional compression pump P secured to the outer extremity of the extended portion of the tube 3.

The upper or outer end of the conduit or pipe 1 is provided with the flanged head 4 of predetermined dimensions and with which is operatively engaged the supplemental reservoir or container 5 preferably of glass and having arranged longitudinally thereof the liquid measure indications 6 whereby the quantity of liquid delivered within the supplemental reservoir or container 5 may be readily determined.

Extending within the supplemental reservoir or container 5 and in communication with the atmosphere through the head 4 is the air vent 7, the inner end of said vent terminating in close proximity to the upper end of the supplemental reservoir or container. As is believed to be self-evident, the vent 7 facilitates the entry of the liquid into or the discharge of the liquid from the supplemental reservoir or container.

Interposed in the pipe or conduit 1 is the controlling member M comprising an outer cylinder 8 having in communication therewith the discharge spout 9 and having the opposed ports 10 and 11 adapted for communication with the container or barrel B and the supplemental container or reservoir 5, respectively. Rotatably supported within the cylinder 8 is the three-way valve 12 adapted to be properly manipulated through the medium of the handle 14 secured to the exterior portion of the stem 15 of the valve 12. The ports 16 and 17 of the valve are in radial alinement while the port 18 is perpendicularly disposed relatively thereto so that when the port 17 is in register with the discharge spout 9, the port 18 is in communication with the supplemental container or reservoir 5 and the communication with the source of liquid supply is shut off so that the liquid within the supplemental container or reservoir may be discharged. With the radially alined ports 16 and 17 in communication with the ports 10 and 11, the air pressure within the container or barrel will lift the liquid therein up into the supplemental container or reservoir 6 and when a predetermined amount of liquid has been received within said supplemental container or reservoir 5, the valve 12 will be manipulated so that the liquid within the supplemental reservoir or container may be discharged through the spout 9 in a manner as has been hereinbefore set forth.

It will be understood that under normal conditions the valve 12 will be adjusted into a neutral position.

From the foregoing description, it is thought to be obvious that a dispensing means for liquids constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

A dispensing apparatus including a reservoir, a conduit removably insertible within the reservoir, an attaching member carried by the conduit intermediate the length thereof and adapted to connect with the reservoir, a container supported by and in communication with the other end of the conduit, a cylinder interposed in the conduit intermediate the container and the attaching member, a discharge spout in communication with the cylinder, a three-way valve within the cylinder for controlling the flow through the conduit and through the spout, a tube disposed within the conduit and having its inner end opening through a wall of the conduit at a point below and in close proximity to the attaching member, the opposite end portion of the tube extending exteriorly of the conduit at a point above the attaching member and forcing means connected to the exterior end of the tube.

In testimony whereof we hereunto affix our signatures in the presence of two witnesses.

FLOYD C. KINGEN.
OLIVER H. McKEE.

Witnesses:
L. M. BURNETT,
WM. C. BATES.